UNITED STATES PATENT OFFICE.

PORTER H. BRACE, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF TREATING NONAQUEOUS ELECTROLYTES.

1,415,983.     Specification of Letters Patent.     Patented May 16, 1922.

No Drawing.     Application filed August 17, 1920. Serial No. 404,105.

*To all whom it may concern:*

Be it known that I, PORTER H. BRACE, a citizen of the United States, and a resident of Wilkinsburg, in the county of Allegheny and State of Pennsylvania, have invented a new and useful Improvement in Methods of Treating Nonaqueous Electrolytes, of which the following is a specification.

My invention relates to a method of treating nonaqueous electrolytes, and, more especially, to the treatment of fused salts preparatory to the electrolysis of the same in producing various metals, it being among the objects thereof to provide a method of treating electrolytes to free the same from occluded gases or vapors.

Heretofore, difficulty has been encountered in the electrolytic reduction of metals from baths of their fused salts due, in large measure, to the fused electrolyte containing occluded or dissolved gases or vapors which materially interfered with the deposition of metal, causing the same to be non-adherent and porous. The electrical efficiency was also greatly reduced by reason of the liberation of such gases, necessitating a higher potential to conduct the electrolysis, giving rise to local currents, and interposing bubbles of gas to the flow of current, thus increasing the resistance of the cell.

Electrolytes in the fused state and even at high temperatures often retain quantities of gases and vapors in solution with considerable tenacity. These retained gases and vapors are liberated during the decomposition of the salt by the electric current and constitute a source of disturbances, such as stated above, which are particularly troublesome at the cathode where the deposition of metal takes place, interfering with the deposition of a dense, coherent product.

I have discovered that, by adding to the electrolyte a small quantity of a material which is capable of causing dissolved or occluded gases or vapors to be released or chemically fixed, such gases or vapors are readily removed. I usually add a small quantity of an active metal to the fused electrolyte previous to electrolyzing the same, with the result that the dissolved and occluded gases are removed, allowing the electrolysis to proceed quietly and uniformly, giving a product of greater purity, density and coherence than could formerly be produced.

The following is an example of the application of my new method to the treatment of fused electrolytes: Metallic calcium is generally prepared by electrolyzing anhydrous, fused calcium chloride, usually with the addition of other fused salts. When the commercial anhydrous chloride is fused and immediately electrolyzed, considerable quantities of gases are given off, particularly at the cathode, making it rather difficult to secure a good deposit.

In applying my method to such an electrolyte, I fuse the commercial anhydrous calcium chloride, heat the same to a temperature slightly above the melting point and add a small quantity of metallic calcium thereto, preferably stirring the same into the molten mass while allowing the same to cool and solidify. During the addition and stirring of the calcium, a reaction occurs whereby the dissolved and occluded gases are released from the salt and removed. In some cases, it is desirable to effect a further removal of gases and this is accomplished by again melting the cooled and solidified anhydrous chloride obtained from the above described treatment, adding a further small quantity of metallic calcium, and stirring the molten mass, while allowing the same to cool until the mass becomes pasty and solidifies. The total quantity of metallic calcium necessary to produce purification of the salt is generally less than one part in 500 and a small excess of added calcium does not appear to be detrimental.

The chloride, as treated above, is generally again fused before it has cooled down below 400° C. and is then cast into suitable molds. The ingots so produced are translucent, white, and perfectly sound, and show a well developed crystalline structure when fractured, whereas, without the above treatment, the solidified electrolyte is found to be full of blow holes and cavities. The ingots so produced are usually melted down and electrolyzed, the electrolysis proceeding quietly and uniformly without the evolution of gases or disturbances at the cathode. I sometimes omit the casting of the electrolyte into molds and simply fuse the treated salt and electrolyze immediately.

I have not yet definitely determined the nature of the action of the degasifying agent, but I believe that it is at least partly a chemical action whereby occluded gases or vapors are rendered inactive by reason of their combination with the degasifying agent, forming a stable compound.

Although I have described my method as applicable to the production of a pure calcium chloride suitable for electrolysis, my process may be applied to electrolytes other than calcium chloride and metals other than calcium, which are chemically active to release gases contained in fused electrolytes, may be employed. For instance, metallic sodium or other alkali or alkali earth metals may be used, but I believe calcium to be the most suitable on account of its low volatility and great activity at the high temperatures generally used in fused electrolyte electrolysis.

Having thus fully described my said invention, what I claim as new and desire to secure by Letters Patent is:—

1. A method of treating a nonaqueous electrolyte which consists in adding to said electrolyte a material capable of causing dissolved or occluded gases to be released.

2. A method of treating a nonaqueous electrolyte which consists in adding to said electrolyte a metal capable of causing dissolved or occluded gases to be released.

3. A method of treating a nonaqueous electrolyte which consists in adding metallic calcium thereto.

4. A method of treating a nonaqueous electrolyte which consists in fusing said electrolyte, and adding thereto a substance capable of causing dissolved or occluded gases to be released.

5. A method of treating a nonaqueous electrolyte which consists in fusing said electrolyte, and adding thereto a metal capable of causing dissolved or occluded gases to be released.

6. A method of treating a nonaqueous electrolyte which consists in fusing said electrolyte, and adding metallic calcium thereto.

7. A method of treating a nonaqueous electrolyte which consists in adding to such electrolyte a relatively small proportion of an alkali metal.

8. A method of treating a nonaqueous electrolyte which consists in adding to said electrolyte less than five-tenths of 1% of metallic calcium.

9. A method of treating a nonaqueous electrolyte which consists in melting said electrolyte, adding thereto a metal capable of causing dissolved or occluded gases to be released, and stirring the molten electrolyte while allowing the same to cool.

10. A method of treating a nonaqueous electrolyte which consists in fusing said electrolyte, adding thereto a metal capable of causing dissolved or occluded gases to be released, stirring the molten electrolyte while allowing the same to solidify, remelting the same, and again treating with a metal as above.

11. A method of treating a nonaqueous electrolyte which consists in fusing said electrolyte, adding thereto a metal capable of causing dissolved or occluded gases to be released, stirring the molten electrolyte, while allowing the same to solidify, fusing the electrolyte so treated, and casting the same into ingots.

12. A method of treating calcium chloride electrolytes which consists in fusing the same and adding thereto a small amount of metallic calcium.

In testimony whereof, I have hereunto subscribed my name this 11th day of August, 1920.

PORTER H. BRACE.